US012586110B2

(12) United States Patent
Gage

(10) Patent No.: US 12,586,110 B2
(45) Date of Patent: Mar. 24, 2026

(54) SYSTEMS AND METHODS FOR REAL-TIME VEHICLE UPGRADE AND CUSTOMIZATION

(71) Applicant: Toyota Motor North America, Inc., Plano, TX (US)

(72) Inventor: Sergei Gage, Dallas, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 102 days.

(21) Appl. No.: 18/588,362

(22) Filed: Feb. 27, 2024

(65) Prior Publication Data

US 2025/0272729 A1    Aug. 28, 2025

(51) Int. Cl.
*G06Q 30/0601* (2023.01)
(52) U.S. Cl.
CPC ................................. *G06Q 30/0621* (2013.01)
(58) Field of Classification Search
CPC .................................................. G06Q 30/0621
USPC ............................................................ 705/66
See application file for complete search history.

(56) References Cited

U.S. PATENT DOCUMENTS 11,682,015 B2    6/2023    Andon et al.

FOREIGN PATENT DOCUMENTS

DE    102023005085 A1 *    5/2024    ............. G06Q 20/06
WO    WO-2024132299 A1 *    6/2024    ........ B60W 50/0098

OTHER PUBLICATIONS

Floman "Nexar releases first-ever AI vision technology to reconstruct car accident scenes", Mar. 24, 2021, 10 pages (Year: 2021).*
English translation of DE 102023005085 (Year: 2023).*
English translation of WO 2024132299 A1 (Year: 2023).*
Floman, Roni, Nexar releases first-ever AI vision technology toreconstruct car accident scenes, Mar. 24, 2021, https://data.getnexar.com/blog/nexar-releases-first-ever-ai-vision-technology-to-reconstruct-car-accident-scenes/.

* cited by examiner

*Primary Examiner* — James D Nigh
(74) *Attorney, Agent, or Firm* — Dinsmore & Shohl LLP

(57) ABSTRACT

A vehicle upgrade system includes a processor and a non-transitory, processor-readable storage medium communicatively coupled to the processor and including one or more instructions stored thereon that, when executed, cause the processor to access a digital non-fungible token wallet of a vehicle owner; import one or more customization NFTs stored in the digital NFT wallet; and adjust one or more vehicle characteristics according to the one or more customization NFTs stored in the digital NFT wallet.

18 Claims, 2 Drawing Sheets

VEHICLE UPGRADE SYSTEM

SYSTEMS AND METHODS FOR REAL-TIME VEHICLE UPGRADE AND CUSTOMIZATION

FIELD

The present disclosure generally relates to devices for vehicle upgrades, and more particularly, to real-time vehicle upgrade and customization using non-fungible tokens.

BACKGROUND

While non-fungible tokens have garnered recent popularity and usage, there exist numerous challenges in the integration and gamification of them within the automotive domain to improve vehicle ownership experience. These and other deficiencies exist.

BRIEF DESCRIPTION OF THE DRAWINGS

In one aspect, a vehicle upgrade system may include a processor, and a non-transitory, processor-readable storage medium communicatively coupled to the processor, the non-transitory, processor-readable storage medium comprising one or more instructions stored thereon that, when executed, cause the processor to: access a digital non-fungible token wallet of a vehicle owner; import one or more customization NFTs stored in the digital NFT wallet; and adjust one or more vehicle characteristics according to the one or more customization NFTs stored in the digital NFT wallet.

In another aspect, a method may include accessing a digital non-fungible token wallet of a vehicle owner. The method may include importing one or more customization NFTs stored in the digital NFT wallet. The method may include adjusting one or more vehicle characteristics according to the one or more customization NFTs stored in the digital NFT wallet.

Figure 1:
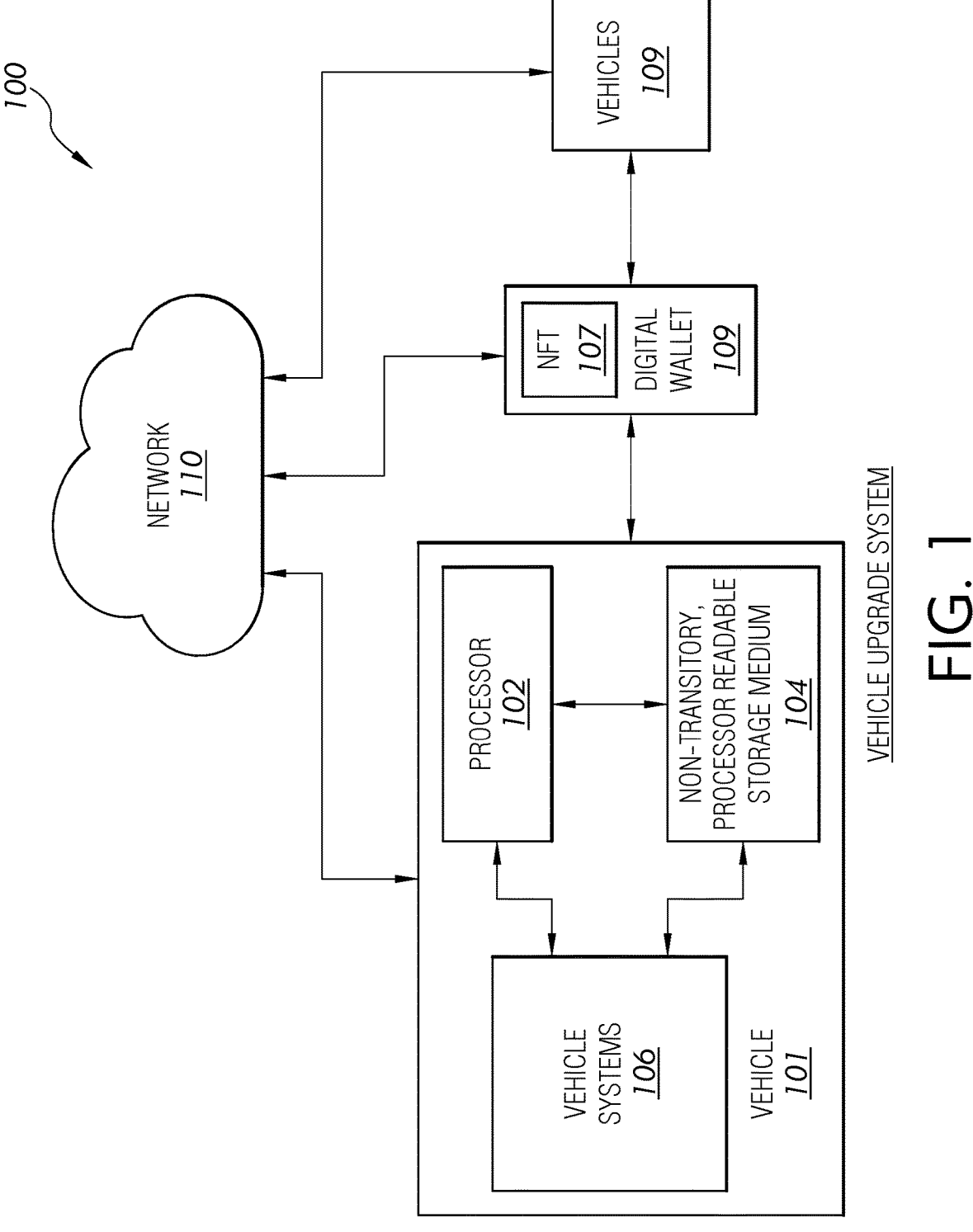

In another aspect, a non-transitory, computer-readable medium including instructions that, when executed by at least one processor, cause the at least one processor to perform one or more operations including accessing a digital non-fungible token wallet of a vehicle owner; importing one or more customization NFTs stored in the digital NFT wallet; and adjusting one or more vehicle characteristics according to the one or more customization NFTs stored in the digital NFT wallet.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

Figure 2:
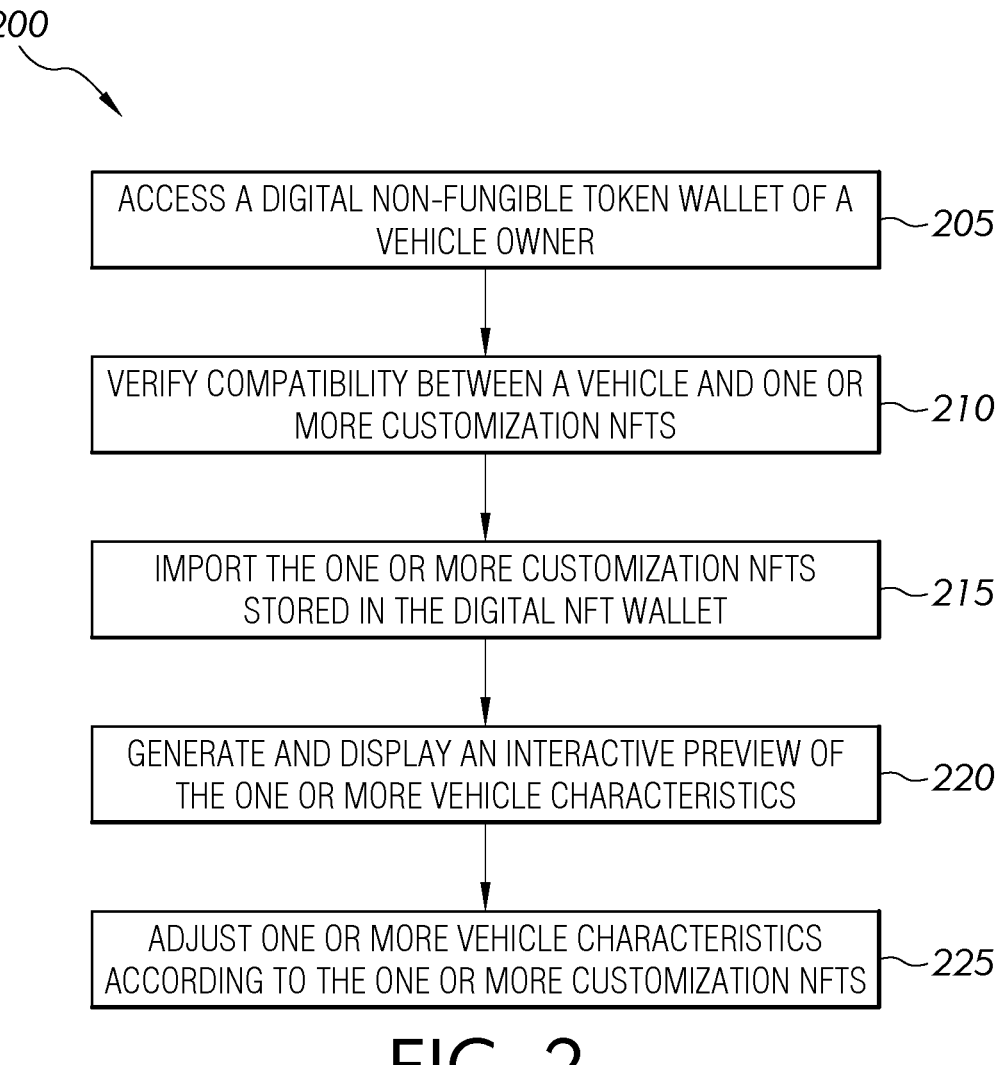

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 1 depicts a schematic diagram of an example vehicle upgrade system, according to one or more embodiments shown and described herein; and FIG. 2 depicts a flow diagram of an example method to be performed by a processor, according to one or more embodiments shown and described herein.

DETAILED DESCRIPTION

The systems and methods disclosed herein provide integration of non-fungible tokens (NFTs) with vehicle upgrades and customizations. Owners can purchase and attach NFTs that represent specific upgrades or customization options to their vehicles. This allows for easy transfer of these enhancements between vehicles, and in certain embodiments between vehicle owners, thereby fostering a flexible and personalized vehicle ownership experience. In this manner, the techniques disclosed by the systems and methods provide for integration and gamification of NFTs with the automotive domain. The systems and methods disclosed herein leverage NFTs to facilitate the transfer and management of vehicle enhancements and customization options.

FIG. 1 depicts a schematic diagram of an example vehicle upgrade system 100. As illustrated in FIG. 1, the vehicle upgrade system 100 includes a vehicle 101, a processor 102, a non-transitory processor readable storage medium 104, vehicle systems 106, a non-fungible token 107, a digital wallet 108, vehicles 109, and a network 110. Although FIG. 1 illustrates single instances of the constituent components of the vehicle upgrade system 100, the vehicle upgrade system 100 may include any number of constituent components.

In certain embodiments, the vehicle 101 may include an autonomous driving vehicle. In other embodiments, the vehicle 101 may include a vehicle that is not an autonomous driving vehicle. Without limitation, the vehicle 101 may include a passenger vehicle, a non-passenger vehicle, a taxi, a bus, a scooter, a motorcycle, a truck, or any other type of vehicle.

The processor 102, such as a central processing unit (CPU), may be the central processing unit that is configured to perform calculations and logic operations to execute one or more programs. The processor 102, alone or in conjunction with the other components, may be an illustrative processing device, computing device, processor, or combinations thereof, including, for example, a multi-core processor, a microcontroller, a field-programmable gate array (FPGA), or an application-specific integrated circuit (ASIC). The processor 102 may include any processing component configured to receive and execute instructions (such as from the non-transitory processor readable storage medium 104).

In some examples, the processing device may execute one or more applications, such as software applications, that enable, for example, network communications with one or more components of the vehicle upgrade system 100 and transmit and/or receive data.

The non-transitory processor readable storage medium 104 may contain one or more data repositories for storing data that is received and/or generated. The non-transitory processor readable storage medium 104 may be any physical storage medium, including, but not limited to, a hard disk drive (HDD), memory (e.g., read-only memory (ROM), programmable read-only memory (PROM), random access memory (RAM), double data rate (DDR) RAM, flash memory, and/or the like), removable storage, a configuration file (e.g., text) and/or the like. While the non-transitory processor readable storage medium 104 is depicted as a local device, it should be understood that the non-transitory processor readable storage medium 104 may be a remote storage device, such as, for example, a server computing device, cloud-based storage device, or the like.

The vehicle systems 106 may include, without limitation, infotainment interface systems, on-board computer systems, sensors, image acquisition devices, or any combination thereof. In certain embodiments, the vehicle systems 106 may include any type of system onboard the vehicle 101. It is understood that the vehicle systems 106 may also include systems not onboard the vehicle 101, including but not limited to systems external to the vehicle 101, and in particular, any system configured to operatively communicate with the vehicle 101 that is not physically located within the vehicle 101 itself.

The digital wallet 108 may include any number of non-fungible tokens (NFTs) 107. In certain embodiments, the digital wallet 108 may be stored in a mobile device. In certain embodiments, the digital wallet 108 may be stored in a cloud-based storage, a server, a database, or any combination thereof. The NFT 107 may comprise a blockchain-based token that is configured to represent a unique asset, including but not limited to digital content, art, or media, that can be bought, sold, and/or traded, and that are owned by a specific user or vehicle owner. The NFT 107 may include distinguishable information, such as the owner of the digital asset as well as who sold it, and when it was sold. Such information may also be encrypted. The NFT 107 may be configured to generate a blockchain-based digital certificate for digital assets, which provides a unique identity. In certain embodiments, the NFT 107 may exist on Ethereum blockchain, a distributed public ledger that records all transactions. Through use of the NFT 107, the digital assets therein may be secured from any type of forgery and also provides the digital assets with a particular value and authenticity. It is understood that the NFT 107 may be bought, sold, and/or traded via, without limitation, a mobile device, a laptop, a computer, or the like.

The vehicles 109 may be additional to vehicle 101, and may each be configured to include the same constituent components of vehicle 101. Similarly, the vehicles 109 may, in certain embodiments, include an autonomous driving vehicle. In certain embodiments, the vehicles 109 may not include an autonomous driving vehicle.

The network 110 may be one or more of a wireless network, a wired network, or any combination of wireless network and wired network, and may be configured to operably communicate with any and all of the constituent components of the vehicle upgrade system 100. For example, network 110 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like. In addition, the network 110 may include, without limitation, telephone lines, fiber optics, IEEE Ethernet 802.3, a wide area network, a wireless personal area network, a LAN, or a global network such as the Internet. In addition, the network 110 may support an Internet network, a wireless communication network, a cellular network, or the like, or any combination thereof. The network 110 may further include one network, or any number of the exemplary types of networks mentioned above, operating as a stand-alone network or in cooperation with each other. The network 110 may utilize one or more protocols of one or more network elements to which they are communicatively coupled. The network 110 may translate to or from other protocols to one or more protocols of network devices. Although the network 110 is depicted as a single network, it should be appreciated that in one or more aspects, the network 110 may include a plurality of interconnected networks, such as, for example, the Internet, a service provider's network, a cable television network, corporate networks, such as credit card association networks, and home networks.

The vehicle upgrade system 100 is configured for the creation and initialization of NFT, the selection of upgrades and customizations, the transfer and ownership of NFT, integration with vehicle systems, digital asset integration, transferability and resale options, compatibility verification, user-friendly interfaces, and an enhanced ownership experience, or any combination thereof. The vehicle upgrade system 100 empowers vehicle owners to personalize their vehicles with upgrades and customizations while leveraging the security and flexibility provided by NFT technology.

The processor 102 may be configured to access a digital wallet 108 of an owner of a vehicle 101. The digital wallet 108 may be configured to store any number of NFTs 107. For example, the digital wallet 108 may store one or more customization NFTs 107. Regarding the NFT 107 creation and initialization, in certain embodiments, each enhancement or customization option to a vehicle 101 may be represented by a unique NFT 107. For example, the processor 102 may be configured to create and initialize these NFTs 107 with details pertaining to a specific upgrade or customization relative to the vehicle 101. By way of example, this may include the type, specifications, compatibility, and any associated digital assets, such as 3D models, design templates, or the like.

Regarding the upgrade and customization selection, in certain embodiments, vehicle owners or users may explore, via the processor 102, available NFTs 107 that represent different upgrades and customizations. For example, the vehicle owners or users may browse through, via the processor 102, a catalog or a selection guide to locate NFTs 107. For example, the vehicle owners or users may select through dropdown menu selection boxes to narrow or filter, via the processor 102, the NFTs 107. Alternatively and/or additionally, the vehicle owners or users may search, via the processor 102, for one or more specific options that match their preferences and/or requirements as it pertains to their desires regarding the vehicle upgrade and customization. For example, the vehicle owners or users may enter a search string to locate, via the processor 102, the NFTs 107.

The processor 102 may be configured verify compatibility between a vehicle and one or more NFTs 107. Regarding compatibility verification, the processor 102 may be configured to verify the compatibility between the vehicle and the NFT 107 prior to its transfer or activation. In certain embodiments, this verification process may include cross-referencing vehicle specifications, identifying one or more potential conflicts, or conducting automated compatibility checks. This verification process by the processor 102 may thereby ensure compatibility and prevent misuse of the NFT 107.

The processor 102 may be configured to import the one or more NFTs 107 stored in the digital wallet 108. Regarding NFT 107 transfer and ownership, in certain embodiments, when a vehicle owner or user decides to acquire an upgrade or customization option, they may initiate, via the processor 102, a transfer of the associated NFT 107 to their digital wallet 108. This transfer transaction securely transfers ownership of the NFT 107, confirming their entitlement to the specific enhancement or customization. Regarding transferability and resale, NFTs 107 representing vehicle grades and customizations may be traded or resold on specialized platforms or marketplaces. In certain embodiments, vehicle owners or users who no longer desire a particular upgrade or customization may transfer, via the processor 102, the associated NFT 107 to another vehicle 109 owner or user, thereby allowing them to benefit from the enhancement.

The processor 102 may be configured to generate an interactive preview of the one or more vehicle characteristics. Regarding user-friendly interfaces, including but not limited to mobile software applications executed on mobile devices and/or web-based platforms, these may be configured to provide vehicle owners or users with easy access to browse, select, and/or manage, via the processor 102, NFT-enabled upgrades and customizations. Moreover, these user-friendly interfaces may be configured to include, via the processor 102, interactive previews and/or simulations to assist vehicle owners or users better visualize the enhancement or customization prior to making its selection. In certain embodiments, the processor 102 may be configured to display the interactive preview of the one or more vehicle characteristics. For example, the vehicle owner or user may, via their mobile device and/or through the vehicle systems 106, view and interact in real-time with the preview of the one or more vehicle characteristics relative to the vehicle 101.

The processor 102 may be configured to adjust one or more vehicle characteristics according to the one or more NFTs 107. Regarding integration with vehicle systems 106, the processor 102 may be configured to interact with constituent components of vehicle systems 106. By way of example and without limitation, the constituent components may include infotainment interfaces and/or on-board computers of vehicle systems 106. These constituent components of vehicle systems 106 may be configured to recognize and interact with the NFTs 107. In certain embodiments, upon detecting a valid NFT 107, the vehicle systems 106 may configure itself accordingly to activate and/or apply the associated upgrade or customization that was selected, via the processor 102, by the vehicle owner or user.

Regarding digital asset integration with vehicle systems 106, to the extent the NFT 107 includes digital assets, such as the 3D models or design templates, these digital assets may be integrated into the vehicle systems 106 for visual customization. For example, a digital asset comprising a new interior trim may be applied to the virtual representation of the interior of the vehicle 101 in the infotainment system of the vehicle systems 106.

Regarding enhanced ownership experience, by utilizing NFTs 107 for upgrades and customizations, the processor 102 may be configured to enhance the ownership experience by offering flexible and customizable options. In certain embodiments, the vehicles owners or users have the ability to, via the processor 102, personalize and modify their vehicles according to their preferences. The NFTs 107 ensure a secure and traceable process for managing these preferences.

FIG. 2 depicts a flow diagram of an example method 200 performed by the processor 102. FIG. 2 may reference and incorporate any of the above constituent components and corresponding disclosure explained above with respect to FIG. 1, such as the example vehicle upgrade system 100.

At block 205, the processor may be configured to access a digital wallet of an owner of a vehicle. The digital wallet may be configured to store any number of NFTs. For example, the digital wallet may store one or more customization NFTs. Regarding the NFT creation and initialization, in certain embodiments, each enhancement or customization option to a vehicle may be represented by a unique NFT. For example, the processor may be configured to create and initialize these NFTs with details pertaining to a specific upgrade or customization relative to the vehicle. By way of example, this may include the type, specifications, compatibility, and any associated digital assets, such as 3D models, design templates, or the like.

Regarding the upgrade and customization selection, in certain embodiments, vehicle owners or users may explore, via the processor, available NFTs that represent different upgrades and customizations. For example, the vehicle owners or users may browse through, via the processor, a catalog or a selection guide to locate NFTs. For example, the vehicle owners or users may select through dropdown menu selection boxes to narrow or filter, via the processor, the NFTs. Alternatively and/or additionally, the vehicle owners or users may search, via the processor, for one or more specific options that match their preferences and/or requirements as it pertains to their desires regarding the vehicle upgrade and customization. For example, the vehicle owners or users may enter a search string to locate, via the processor, the NFTs.

At block 210, the processor may be configured verify compatibility between a vehicle and one or more NFTs. Regarding compatibility verification, the processor may be configured to verify the compatibility between the vehicle and the NFT prior to its transfer or activation. In certain embodiments, this verification process may include cross-referencing vehicle specifications, identifying one or more potential conflicts, or conducting automated compatibility checks. This verification process by the processor may thereby ensure compatibility and prevent misuse of the NFT.

At block 215, the processor may be configured to import the one or more NFTs stored in the digital wallet. Regarding NFT 107 transfer and ownership, in certain embodiments, when a vehicle owner or user decides to acquire an upgrade or customization option, they may initiate, via the processor, a transfer of the associated NFT to their digital wallet. This transfer transaction securely transfers ownership of the NFT, confirming their entitlement to the specific enhancement or customization. Regarding transferability and resale, NFTs representing vehicle grades and customizations may be traded or resold on specialized platforms or marketplaces. In certain embodiments, vehicle owners or users who no longer desire a particular upgrade or customization may transfer, via the processor, the associated NFT to another vehicle owner or user, thereby allowing them to benefit from the enhancement.

At block 220, the processor may be configured to generate an interactive preview of the one or more vehicle characteristics. Regarding user-friendly interfaces, including but not limited to mobile software applications executed on mobile devices and/or web-based platforms, these may be configured to provide vehicle owners or users with easy access to browse, select, and/or manage, via the processor, NFT-enabled upgrades and customizations. Moreover, these user-friendly interfaces may be configured to include, via the processor, interactive previews and/or simulations to assist vehicle owners or users better visualize the enhancement or customization prior to making its selection. In certain embodiments, the processor may be configured to display the interactive preview of the one or more vehicle characteristics. For example, the vehicle owner or user may, via their mobile device and/or through the vehicle systems, view and interact in real-time with the preview of the one or more vehicle characteristics relative to the vehicle.

At block 225, the processor may be configured to adjust one or more vehicle characteristics according to the one or more NFTs. Regarding integration with vehicle systems, the processor may be configured to interact with constituent components of vehicle systems. By way of example and without limitation, the constituent components may include infotainment interfaces and/or on-board computers of vehicle systems. These constituent components of vehicle systems may be configured to recognize and interact with the NFTs. In certain embodiments, upon detecting a valid NFT, the vehicle systems may be configure itself accordingly to activate and/or apply the associated upgrade or customization that was selected, via the processor, by the vehicle owner or user.

Regarding digital asset integration with vehicle systems, to the extent the NFT includes digital assets, such as the 3D models or design templates, these digital assets may be integrated into the vehicle systems for visual customization. For example, a digital asset comprising a new interior trim may be applied to the virtual representation of the interior of the vehicle in the infotainment system of the vehicle systems.

Regarding enhanced ownership experience, by utilizing NFTs for upgrades and customizations, the processor may be configured to enhance the ownership experience by offering flexible and customizable options. In certain embodiments, the vehicles owners or users have the ability to, via the processor, personalize and modify their vehicles according to their preferences. The NFTs ensure a secure and traceable process for managing these preferences.

The systems and methods disclosed herein provide integration of non-fungible tokens (NFTs) with vehicle upgrades and customizations. Owners can purchase and attach NFTs that represent specific upgrades or customization options to their vehicles. This allows for easy transfer of these enhancements between vehicles, and in certain embodiments between vehicle owners, thereby fostering a flexible and personalized vehicle ownership experience. In this manner, the techniques disclosed by the systems and methods provide for integration and gamification of NFTs with the automotive domain. The systems and methods disclosed herein leverage NFTs to facilitate the transfer and management of vehicle enhancements and customization options.

Further aspects of the disclosure are provided by the subject matter of the following clauses.

A vehicle upgrade system, comprising: a processor; and a non-transitory, processor-readable storage medium communicatively coupled to the processor, the non-transitory, processor-readable storage medium comprising one or more instructions stored thereon that, when executed, cause the processor to: access a digital non-fungible token wallet of a vehicle owner; import one or more customization NFTs stored in the digital NFT wallet; and adjust one or more vehicle characteristics according to the one or more customization NFTs stored in the digital NFT wallet.

The vehicle upgrade system of the previous clause, wherein the one or more instructions further cause the processor to verify, prior to import of the one or more customization NFTs, compatibility between a vehicle and the one or more customization NFTs.

The vehicle upgrade system of any of the previous clauses, wherein the one or more instructions further cause the processor to browse, via one or more user interfaces, the one or more customization NFTs.

The vehicle upgrade system of the previous clause, wherein the one or more instructions further cause the processor to: generate an interactive preview of the one or more vehicle characteristics; and display, via the one or more user interfaces, the interactive preview.

The vehicle upgrade system of any of the previous clauses, wherein the one or more customization NFTs comprises one or more digital assets, the one or more digital assets including a three-dimensional model, a design template, or any combination thereof.

The vehicle upgrade system of any of the previous clauses, wherein the one or more instructions further cause the processor to integrate one or more vehicle systems with the one or more customization NFTs.

A method, comprising: accessing, by a vehicle control system, a digital non-fungible token wallet of a vehicle owner; importing one or more customization NFTs stored in the digital NFT wallet; and adjusting one or more vehicle characteristics according to the one or more customization NFTs stored in the digital NFT wallet.

The method of the previous clause, further comprising verifying, prior to importing the one or more customization NFTs, compatibility between a vehicle and the one or more customization NFTs.

The method of any of the previous clauses, further comprising modifying the one or more customization NFTs.

The method of any of the previous clauses, further comprising browsing, via one or more user interfaces, the one or more customization NFTs.

The method of any of the previous clauses, further comprising: generating an interactive preview of the one or more vehicle characteristics; and displaying, via the one or more user interfaces, the interactive preview.

The method of any of the previous clauses, wherein the one or more customization NFTs comprises one or more digital assets, the one or more digital assets including a three-dimensional model, a design template, or any combination thereof.

The method of any of the previous clauses, further comprising integrating one or more vehicle systems with the one or more customization NFTs.

A non-transitory computer-readable medium comprising instructions that, when executed by at least one processor, cause the at least one processor to perform one or more operations comprising: accessing, by a vehicle control system, a digital non-fungible token wallet of a vehicle owner; importing one or more customization NFTs stored in the digital NFT wallet; and adjusting one or more vehicle characteristics according to the one or more customization NFTs stored in the digital NFT wallet.

The non-transitory computer-readable medium of any of the previous clauses, the one or more operations further comprising verifying, prior to importing the one or more customization NFTs, compatibility between a vehicle and the one or more customization NFTs.

The non-transitory computer-readable medium of any of the previous clauses, the one or more operations further comprising modifying the one or more customization NFTs.

The non-transitory computer-readable medium of any of the previous clauses, the one or more operations further comprising browsing, via one or more user interfaces, the one or more customization NFTs.

The non-transitory computer-readable medium of any of the previous clauses, the one or more operations further comprising: generating an interactive preview of the one or more vehicle characteristics; and displaying, via the one or more user interfaces, the interactive preview.

The non-transitory computer-readable medium of any of the previous clauses, wherein the one or more customization NFTs comprises one or more digital assets, the one or more digital assets including a three-dimensional model, a design template, or any combination thereof.

The non-transitory computer-readable medium of any of the previous clauses, the one or more operations further comprising integrating one or more vehicle systems with the one or more customization NFTs.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some aspects may be combined in some other aspects. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." For example, reference to an element (e.g., "a processor," "a memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein include one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A vehicle upgrade system, comprising:
a processor; and
a non-transitory, processor-readable storage medium communicatively coupled to the processor, the non-transitory, processor-readable storage medium comprising one or more instructions stored thereon that, when executed, cause the processor to:

access a digital non-fungible token wallet of a vehicle owner;

import one or more customization NFTs stored in the digital NFT wallet by receiving an input corresponding to browsing, via one or more user interfaces, a catalog or a selection guide to locate the one or more customization NFTs by filtering options or searching for options that match a desired preference by entering a search string; and adjust one or more vehicle characteristics according to the one or more customization NFTs stored in the digital NFT wallet.

2. The vehicle upgrade system of claim 1, wherein the one or more instructions further cause the processor to verify, prior to import of the one or more customization NFTs, compatibility between a vehicle and the one or more customization NFTs.

3. The vehicle upgrade system of claim 1, wherein the one or more instructions further cause the processor to:

generate an interactive preview and a simulation of the one or more vehicle characteristics; and display, via the one or more user interfaces, the interactive preview and the simulation.

4. The vehicle upgrade system of claim 3, wherein the one or more instructions further cause the processor to integrate the one or more customization NFTs into one or more vehicle systems of the vehicle for visual customization.

5. The vehicle upgrade system of claim 1, wherein the one or more customization NFTs comprises one or more digital assets, the one or more digital assets including a three-dimensional model, a design template, or any combination thereof.

6. The vehicle upgrade system of claim 1, wherein the one or more instructions further cause the processor to integrate one or more vehicle systems with the one or more customization NFTs.

7. A method, comprising:

accessing, by a vehicle control system, a digital non-fungible token wallet of a vehicle owner;

importing one or more customization NFTs stored in the digital NFT wallet by receiving an input corresponding to browsing, via one or more user interfaces, a catalog or a selection guide to locate the one or more customization NFTs by filtering options or searching for options that match a desired preference by entering a search string; and adjusting one or more vehicle characteristics according to the one or more customization NFTs stored in the digital NFT wallet.

8. The method of claim 7, further comprising verifying, prior to importing the one or more customization NFTs, compatibility between a vehicle and the one or more customization NFTs.

9. The method of claim 7, further comprising modifying the one or more customization NFTs.

10. The method of claim 7, further comprising:

generating an interactive preview and a simulation of the one or more vehicle characteristics; and displaying, via the one or more user interfaces, the interactive preview and the simulation.

11. The method of claim 7, wherein the one or more customization NFTs comprises one or more digital assets, the one or more digital assets including a three-dimensional model, a design template, or any combination thereof.

12. The method of claim 7, further comprising integrating one or more vehicle systems with the one or more customization NFTs.

13. A non-transitory computer-readable medium comprising instructions that, when executed by at least one processor, cause the at least one processor to perform one or more operations comprising:

accessing, by a vehicle control system, a digital non-fungible token wallet of a vehicle owner;

importing one or more customization NFTs stored in the digital NFT wallet by receiving an input corresponding to browsing, via one or more user interfaces, a catalog or a selection guide to locate the one or more customization NFTs by filtering options or searching for options that match a desired preference by entering a search string; and adjusting one or more vehicle characteristics according to the one or more customization NFTs stored in the digital NFT wallet.

14. The non-transitory computer-readable medium of claim 13, the one or more operations further comprising verifying, prior to importing the one or more customization NFTs, compatibility between a vehicle and the one or more customization NFTs.

15. The non-transitory computer-readable medium of claim 13, the one or more operations further comprising modifying the one or more customization NFTs.

16. The non-transitory computer-readable medium of claim 13, the one or more operations further comprising:

generating an interactive preview and a simulation of the one or more vehicle characteristics; and displaying, via the one or more user interfaces, the interactive preview and the simulation.

17. The non-transitory computer-readable medium of claim 13, wherein the one or more customization NFTs comprises one or more digital assets, the one or more digital assets including a three-dimensional model, a design template, or any combination thereof.

18. The non-transitory computer-readable medium of claim 13, the one or more operations further comprising integrating one or more vehicle systems with the one or more customization NFTs.

* * * * *